US008024235B2

(12) United States Patent
Mathew et al.

(10) Patent No.: US 8,024,235 B2
(45) Date of Patent: Sep. 20, 2011

(54) AUTOMATIC SEARCH FUNCTIONALITY WITHIN BUSINESS APPLICATIONS

(75) Inventors: Ashvin Mathew, Kirkland, WA (US); Brendan O'Meara, Bellevue, WA (US); Nicolae Surpatanu, Duvall, WA (US); Eshwar Somashekar, Seattle, WA (US); Rajat Taneja, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 708 days.

(21) Appl. No.: 11/471,834

(22) Filed: Jun. 21, 2006

(65) Prior Publication Data

US 2007/0299817 A1 Dec. 27, 2007

(51) Int. Cl.
*G06Q 20/00* (2006.01)

(52) U.S. Cl. .................................................. 705/26.81

(58) Field of Classification Search .................. None
See application file for complete search history.

(56) References Cited

U.S. PATENT DOCUMENTS

| 5,689,698 | A  | * | 11/1997 | Jones et al. ......................... 707/4 |
| 5,704,029 | A  |   | 12/1997 | Wright, Jr. ..................... 715/505 |
| 6,594,644 | B1 |   | 7/2003  | Van Dusen ....................... 705/39 |
| 6,594,692 | B1 |   | 7/2003  | Reisman ........................ 709/219 |
| 6,766,326 | B1 | * | 7/2004  | Cena .............................. 707/101 |
| 7,444,319 | B1 | * | 10/2008 | Sathyanarayan ................. 707/3 |
| 2002/0083092 | A1 |   | 6/2002 | Simpson ........................ 715/506 |
| 2003/0023626 | A1 |   | 1/2003 | Bretti ............................ 715/506 |
| 2003/0074633 | A1 |   | 4/2003 | Boulmakoul et al. ........ 715/506 |
| 2003/0200272 | A1 | * | 10/2003 | Campise et al. ............... 709/206 |
| 2003/0204813 | A1 |   | 10/2003 | Krause et al. ................. 715/506 |
| 2004/0044951 | A1 | * | 3/2004 | Repko et al. ................... 715/500 |
| 2004/0153359 | A1 | * | 8/2004 | Ho et al. .......................... 705/10 |
| 2004/0249695 | A1 | * | 12/2004 | Clark et al. ....................... 705/9 |
| 2005/0108022 | A1 | * | 5/2005 | Bhattacharya et al. ........... 705/1 |
| 2005/0257134 | A1 | * | 11/2005 | Goodman et al. ............. 715/507 |
| 2006/0031390 | A1 |   | 2/2006 | Motoyama et al. ........... 709/217 |
| 2006/0136309 | A1 | * | 6/2006 | Horn et al. ...................... 705/26 |

OTHER PUBLICATIONS

Ghiassi, M., et al, "Defining the Internet-based supply chain system for mass customized markets," Jun. 2003, Science Direct—Computers and Industrial Engineering, vol. 45, issue 1, pp. 17-41.*
Gunasekaran, A., "A framework for supply chain performance measurement," Feb. 2004, Science Direct—International Journal of Production Economics, vol. 47, issue 3, pp. 333-347.*

(Continued)

*Primary Examiner* — Neveen Abel Jalil
*Assistant Examiner* — Farhan M Syed
(74) *Attorney, Agent, or Firm* — Westman Champlin & Kelly PA

(57) ABSTRACT

Disclosed herein is an integration of automatic search functionality into a business application. The application is monitored for an instance wherein the user is initiating an activity that involves an expenditure. Upon detection of such an activity, a query is automatically generated based on information related to the expenditure. The query is communicated to a search component, from which corresponding search results are eventually received. Finally, at least some information related to the search results is displayed to the user. In one embodiment, assuming the user's express or implicit approval, auto-generation of data and/or modification of business process flow are facilitated based on the search results.

14 Claims, 8 Drawing Sheets

OTHER PUBLICATIONS

Presuitti, William, "Supply management and e-procurement: creating value added in the supply chain," Apr. 2003, Science Direct—Industrial Marketing Management, vol. 32, issue 3, pp. 219-226.*

L. Jones et al.; "Avoiding the Mistake of Cloning: A Case for User-Centered Design Methods to Reengineer Documents," Proc. Of 32nd Hawaii Int'l Conference on System Science, 1999, pp. 1-10.

G. Mentzas.; "Coordination of Joint Tasks in Organizational Processes," Published in "Journal of Information Technology," vol. 8, pp. 139-150, 1993.

Jensen & Scacchi, Chris & Walt.; "Discovery and Analysis of Processes in Vritual Enterprises," Institute for Software Research, Aug. 2003, pp. 1-35.

* cited by examiner

FIG. 4

1 - Purchase Order

File  Edit  View  Actions  Help

Save and Close | Save and New | Receive Items

Purchase Order (Not Received) — 400

Vendor
Vendor name: Contoso Supplier          1/13/2004    No: 1
                                        Phone Number
Contact name: Gregg Smith               Phone:
Vendor address
  111 1st. Ave.                         Terms
  City, State, 11111                    Payment terms: 1% 10 Net 30
  US                                    Shipping terms:
Shipping address                        Shipping method: Pickup
  1234 Main St.                         Delivery date:
  Fargo, ND 32801

Items and expenses
| Name | Description | Qty. | Unit Price | Line Total | On Hand |
|---|---|---|---|---|---|
| Authentic Maj. | Full Suspension Trail Bike — 402 | 10 | $825.00 | $8,250.00 | |

Total amounts:

Memo:

Reference:

Add Links...

Related Products and Services ▼ ×

Full Suspension Trail Bike $750.00 — 406
Shimano Dura-Ace TT/Tri Extra Large
Purchase Now | More details Chrysler PT Cruiser 14" Bike $835.00
These large Dura Ace quality rings fit
Purchase Now | More details Mooneyes 26 Trail Bicycle $775.00 — 408
The choice for time trial & triathalon bikes
Purchase Now | More details Pink Panther 26" Cruiser Bicycle $800.00
Purchase Now | More details

Sponsored Sites — 410

Coho Sports

Variety Cycling

Fitness Department Stores

Recreational Supplies

Nearby Sporting Goods

FIG. 5

1 - Purchase Order

File  Edit  View  Actions  Help

Save and Close | Save and New | Receive Items

Purchase Order (Not Received)  1/13/2004   □□□ × ▶ ⊕ ⊙   No: 1

Vendor
Vendor name : Contoso Supplier ▼    Phone Number
Contact name: Gregg Smith          Phone: _____ ▼
Vendor address: 111 1st. Ave.
City, State, 1111
US

Add Item
Add this item to a new purchase order.
[ Add ]   [ Cancel ]

Shipping address: 1234 Main St.
Fargo, ND 32801

Delivery date: _____ ▼

Items and expenses

| Name | Description | Qty. | Unit Price | Line Total | On Hand |
|---|---|---|---|---|---|
| Authentic Maj. | Full Suspension Trail Bike | 10 | $825.00 (508) | $8,250.00 | |
| | | 30 ▼ | | | |
| | | ▼ | | | |
| | | ▼ | | | |
| | | ▼ 504 | | | |

Total amounts: _____

Memo: _____

Reference: _____

[ Add Links.... ]

Related Products and Services ▼ ×

502
Shimano Dura-Ace TT/Tri Extra Large  $750.00  506
Purchase Now | More details Chrysler PT Cruiser 14" Bike $835.00
These large Dura Ace quality rings fit
Purchase Now | More details Mooneyes 26 Trail Bicycle $775.00
The choice for time trial & triathalon bikes
Purchase Now | More details Pink Panther 26" Cruiser Bicycle $800.00
Purchase Now | More details

Sponsored Sites

Coho Sports

Variety Cycling

Fitness Department Stores

Recreational Supplies

Nearby Sporting Goods

500

1 - Purchase Order

File  Edit  View  Actions  Help

Save and Close | Save and New | Receive Items

Purchase Order (Not Received)    No: 1

Vendor
Vendor name: Wholesale Bikes Inc.
Contact name: Gregg Smith
Vendor address: 111 1st. Ave.
City, State, 11111
US
Shipping address: 1234 Main St.
Fargo, ND 32801

Phone Number
Phone:

Terms
Payment terms: 1% 10 Net 30
Shipping terms:
Shipping method: Pickup
Delivery date: 1/13/2004

Items and expenses

| Name | Description | Qty. | Unit Price | Line Total | On Hand |
|---|---|---|---|---|---|
| Shimano... | Full Suspension Trail Bike | 10 | $750.00 | $7,500.00 | |

Total amounts:

Memo:

Reference:

Add Links...

Related Products and Services

Full Suspension Trail Bike $750.00
Shimano Dura-Ace TT/Tri Extra Large
Purchase Now | More details

Chrysler PT Cruiser 14" Bike $835.00
These large Dura Ace quality rings fit
Purchase Now | More details

Mooneyes 26 Trail Bicycle $775.00
The choice for time trial & triathalon bikes
Purchase Now | More details

Pink Panther 26" Cruiser Bicycle $800.00
Purchase Now | More details

Sponsored Sites

Coho Sports

Variety Cycling

Fitness Department Stores

Recreational Supplies

Nearby Sporting Goods

AUTOMATIC SEARCH FUNCTIONALITY WITHIN BUSINESS APPLICATIONS

BACKGROUND

Sparked by Internet technology, there has been a dramatic proliferation of business data published and made available to users of computing devices. However, it is common for business data to be scattered across a broad range of different data stores associated with a variety of different data sources. Under the circumstances, efficiently accessing relevant data when it is needed can be a real challenge.

Currently, a user using a computing device to accomplish a business task often must stop what he or she is doing in order to manually navigate through different data stores to find a data item that is likely to be relevant to current needs. In most cases, the tools provided to support navigation through data are completely separate from the tools being utilized for business purposes. It is not uncommon for a user to be forced to switch back and forth between a business application and an application configured to support data searching.

In many cases, the process of identifying relevant business data requires a user to sift through search results (e.g., often in a list format) on a trial and error basis in order to determine relevancy of data to current needs. The queries utilized to request the search results are not commonly configured to take contextual considerations into account, such as why the user is searching for certain information or the kind of information most likely to be useful to the user performing the query. Often times, query refining becomes necessary to efficiently locate relevant results. Sometimes, re-querying using different syntax or search terms is the most efficient option. A user is often relied upon to make good and informed search strategy decisions to get to information that satisfies current needs.

The discussion above is merely provided for general background information and is not intended for use as an aid in determining the scope of the claimed subject matter. Further, the claimed subject matter is not limited to implementations that solve any or all disadvantages noted anywhere in the present description.

SUMMARY

Disclosed herein is an integration of automatic search functionality into a business application. The application is monitored for an instance wherein the user is initiating an activity that involves an expenditure. Upon detection of such an activity, a query is automatically generated based on information related to the expenditure. The query is communicated to a search component, from which corresponding search results are eventually received. Finally, at least some information related to the search results is displayed to the user. In one embodiment, assuming the user's express or implicit approval, auto-generation of data and/or modification of business process flow are facilitated based on the search results.

This Summary is provided to introduce a selection of concepts in a simplified form that are further described below in the Detailed Description. This Summary is not intended to identify key features or essential features of the claimed subject matter, nor is it intended for use as an aid in determining the scope of the claimed subject matter.

BRIEF DESCRIPTION OF THE DRAWINGS

FIGS. 3-6 are examples of screenshots associated with a small business accounting software application.

DETAILED DESCRIPTION

With the proliferation of business data being published on the Web and in other electronically accessible mediums, opportunities exist to integrate a business application with automatic search functionality. This functionality can then be exploited for many purposes, such as to reduce manual processing of business documents through intelligent auto-generation, and/or to intelligently modify business process flow. As will become apparent, the value of integrating search is particularly high where the search process is configured to account for contextual considerations that are customized for the user.

Figure 1:
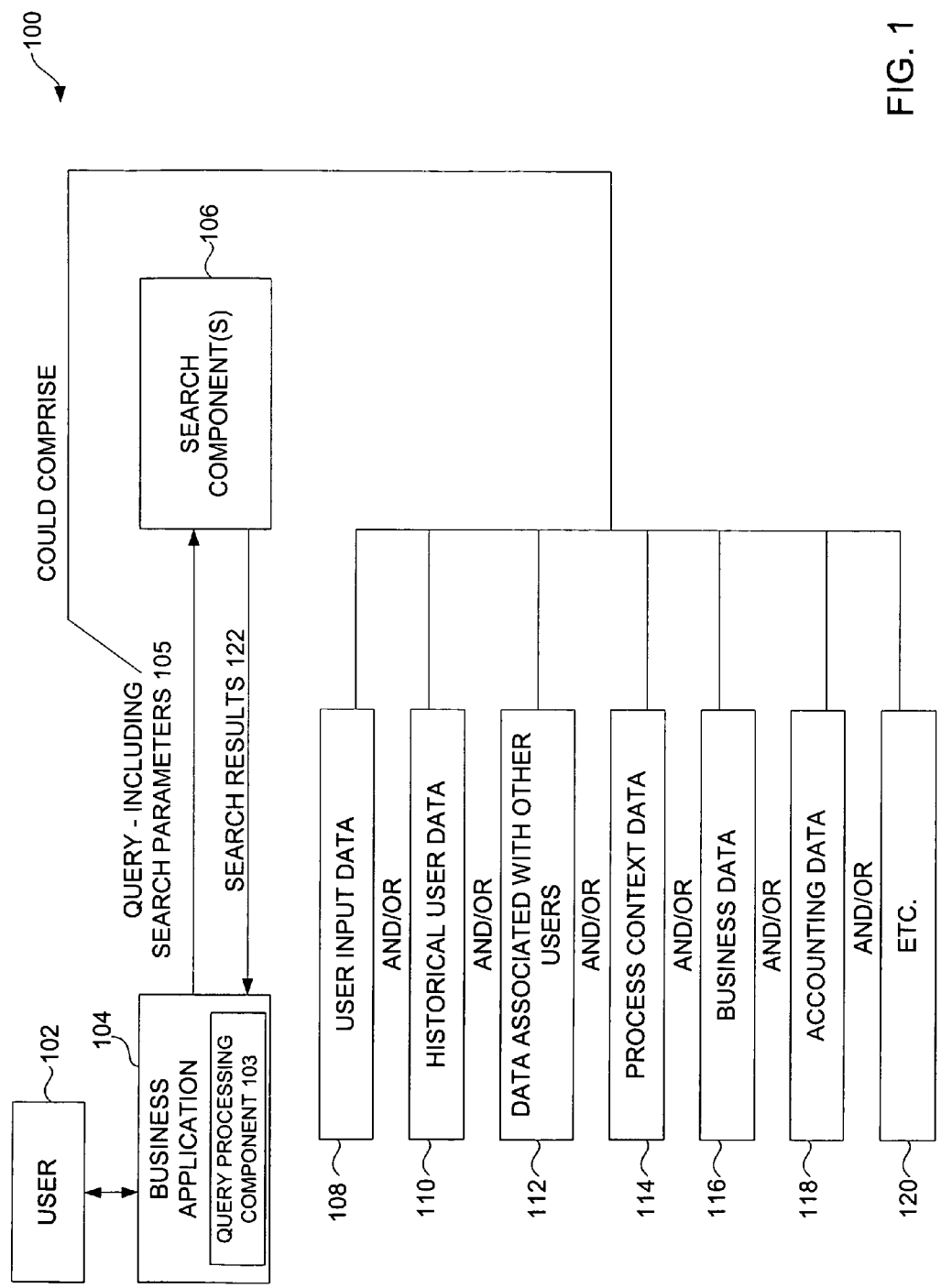
FIG. 1 is a schematic block diagram of a business application system.
Figure 2:
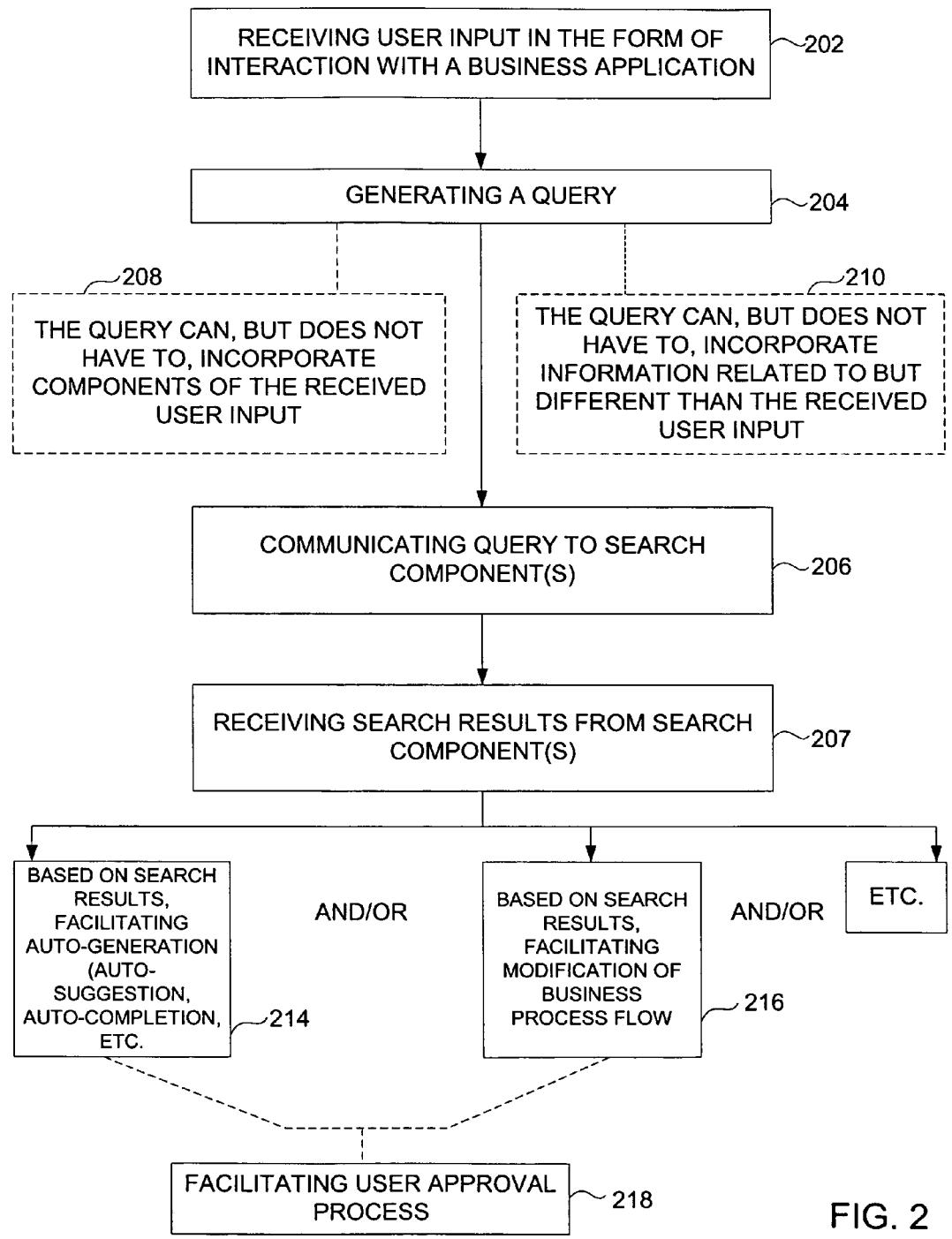
FIG. 2 is a block flow diagram demonstrating a method that can be carried out in the context of the system shown in FIG. 1.

FIG. 1 is a schematic block diagram of a business application system 100. FIG. 2 is a block flow diagram demonstrating a method that can be carried out in the context of system 100. For the purpose of illustration, FIGS. 1 and 2 will be described in conjunction with one another. It should be noted that elements from FIG. 1 have been assigned a number in the 100's and elements in FIG. 2 have been assigned a number in the 200's.

In accordance with block 202, a user 102 interacts with a business application 104. In accordance with block 204, a query is generated. This query generation step is illustratively accomplished by a query processing component 103 that may be part of application 104 but may be otherwise implemented (e.g., as part of an operating system, a service delivered over a network, etc.).

As will become apparent, the generated query is different than a traditional query based on one or more search terms input by the user specifically for the purpose of searching or querying. In fact, as is emphasized by boxes 208 and 210, the query parameters may or may not include data contemporaneously received from the user. As is indicted by block 206, the query is communicated to one or more search components 106. While the precise nature of components 106 is not critical to the present invention, in one embodiment, components 106 include one or more on-line services such as an Internet-based search engine or an advertising engine.

As is shown in FIG. 1, the communication of the query (e.g., communication initiated by application 104 or component 103) involves communicating search parameters 105. As is indicated by blocks 108 through 118, the precise nature of the query search parameters is flexible and could vary from one implementation to the next. Search parameters can include any or all of data contemporaneously input by user 102 (box 108), data input by user 102 historically (box 110), data input or associated with users other than user 102 (box 112), data related to a context in which user 102 is using application 104 (box 114), any business data associated with application 104 or another application (box 116), any accounting data associated with application 104 or another application (box 118), or any other data (box 120). An example, not by limitation, of process context that can be reflected in parameters 105 is information related the identity of a particular step in a business flow within the application. An example, not by limitation, of user input or context data that can be reflected in the parameters is contemporaneously or historically values input by the user such as SIC codes, pricing information, margin information, etc.

Search component(s) 106 process the received query based on some or all of search parameters 105. This leads to the production of search results 122, which are communicated back to business application 104. In one embodiment, a component such as query processing component 103 organizes and/or reformats search parameters 105 into certain formats desirable for certain search component(s) 106. In another embodiment, however, a searching component is configured to analyze search parameters 105 and target results accordingly (e.g., an advertising service). Box 207 represents receipt by application 104 of search results 22.

In one aspect of the present invention, search results 122 are utilized to enhance user 102's experience within application 104. This process may be handled by application 104, by query processing component 103, or by a different independent component (not illustrated). In accordance with box 214, search results 122 are utilized as a basis for providing auto-generation functionality. For example, based on the search results, fields within a display may be automatically filled in, or at least suggestions for filling in fields may be provided for user 102's acceptance or dismissal. In accordance with box 216, search results 122 are utilized as a basis for modifying the flow of a business process within application 104. For example, based on the search results, certain different forms and/or processes may be automatically implemented, or at least suggestions for different forms and/or processes may be provided for user 102's acceptance or dismissal. As is represented by box 218, some implementations may incorporate a user approval process that enables a user to accept or reject changes or proposed changes.

In one aspect of the present invention, system 100 is configured to provide great benefit to user 102 by automatically and implicitly search for information that might impact a business decision while that decision is being acted upon in application 104. Further, the searching process can be based on contextual characteristics of the decision being made (e.g., application context), data being currently input, pre-existing data, user context (e.g., user identity or role within an organization), and/or other data. In this manner, user 102 is automatically presented with choices that may be better than the current choice. Assuming implicit or explicit user consent, based on the search results, the decision itself can be changed, process flow can be changed, auto-generation can be implemented, and/or other outcomes can be triggered as appropriate for a given implementation.

Those skilled in the art will appreciate that there are many ways to implement a system in accordance the present invention and that the illustrated configuration is but one example. Further, within a given implementation, the illustrated components may have a different functionality. For example, query processing component 103 could be implemented as a data abstraction service that publishes search parameters 105 to various search services 106. In this case, the search parameters 105 illustratively include business data in a canonical format. The abstraction service can be configured to transform the canonical data format to satisfy specific format requirements for each search service. This is just one example of a similar but different implementation that should be considered within the scope of the present invention.

In order to further solidify the present description, a more specific example will now be provided. For the purpose of the example, it will be assumed that business application 104 is a small business accounting application configured to employ query processing component 103 to publish data (i.e., search parameters 105), including inventory data and contextual data, to an Internet-based data service 106. Data service 106 processes the search parameters and returns results 122 to query processing component 103. Component 103 then cooperates with application 104 in order to support an automatic alteration of a purchase order and/or a purchase order document. It should be emphasized that the present invention is not limited to the details of this one particular example.

To continue the example, it will now be assumed that the inventory data included in search parameters 105 is transmitted to search component(s) 106 in a canonical format that can include, not by limitation, any of a product name, a product description, a UPC code, price (e.g., normal and or sale), etc. In addition to these types of product information, the business application 104 may also have extensive information about business location and contact information (e.g., e-mail, fax, phone, etc.). Depending on implementation details, the published inventory data can also be tagged with this and other information. The search component(s) 106 to which data is transmitted can include, not by limitation, online search engines, comparison shopping engines, advertising networks, marketplaces, etc.

Figure 3:
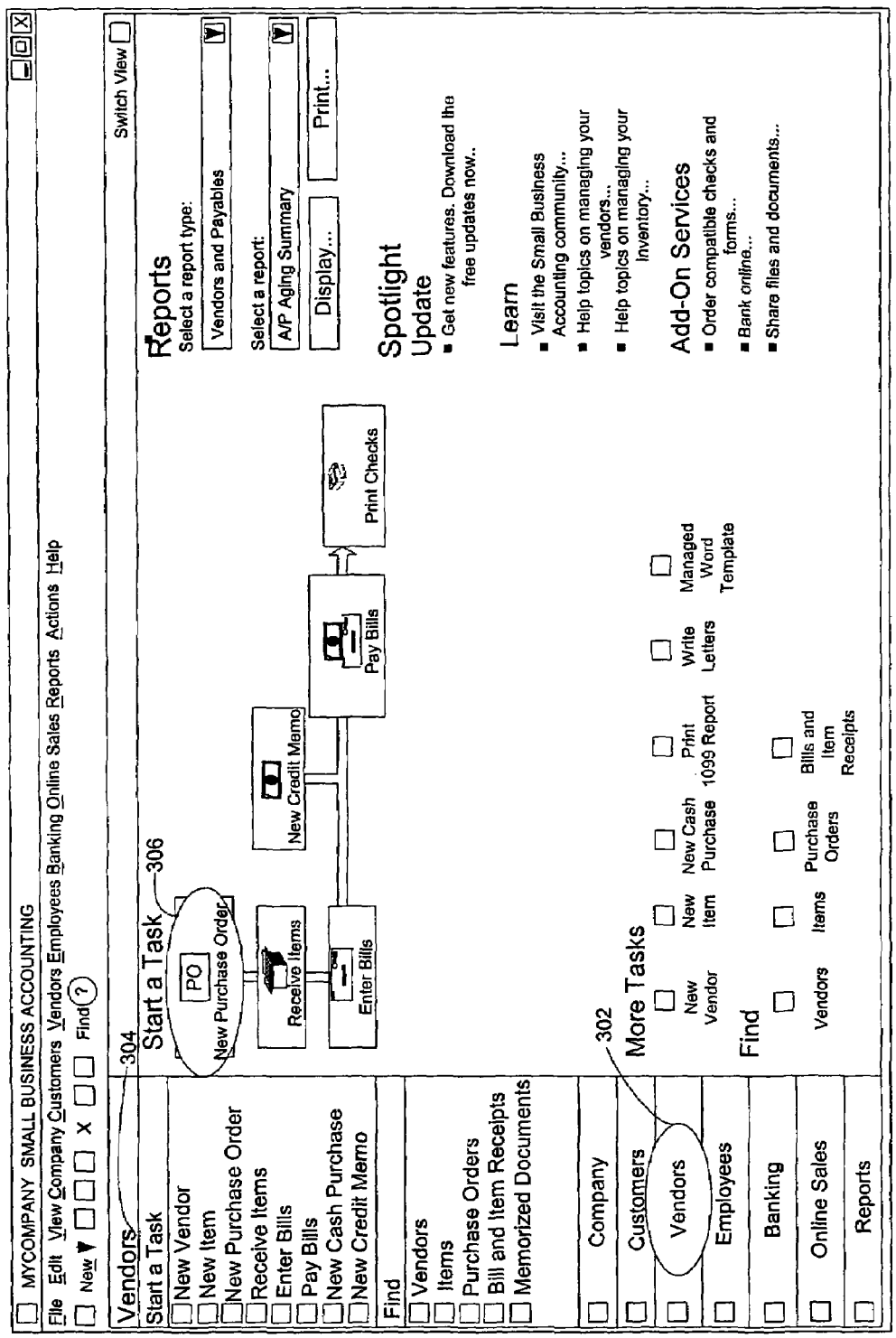

Continuing with the example, FIG. 3 is an example of a screenshot 300 associated with a small business accounting software application. As is indicated by title bar 304, the application is currently in a mode related to business interactions with vendors. Oval 302 demonstrates that this mode may have been entered into following selection of a vendor tab. As is indicated by oval 306, the user next selects a "new purchase order" function associated with a display element.

FIG. 4 is an example of a screenshot 400 associated with the small business accounting software application. Screenshot 400 is illustratively where the user arrives after selecting the "new purchase order" function as noted in relation to FIG. 3. The business function related to screenshot 400 is creation of a new purchase order. In that regard, the user enters information into the noted fields as necessary to support creation of a new purchase order.

In screenshot 400, the user is entering in a purchase order from a vendor noted as "Contoso Supplier." As is indicated by oval 402, the order is to purchase trail bikes. The user has entered a quantity of 10 at a list price of $825 per bike. As has been described herein, while the user interacts with the application so as to participate in the process of creating a purchase order, a searching process is carried out behind the scenes.

More specifically, an automatic context-sensitive search is carried out without requiring the user's attention to be switched to facilitating the search. The search is conducted based on indirectly derived search parameters such as, but not limited to, the information that the user has entered into the various fields, application context (e.g., purchase order context) or any appropriate business data (e.g., price, vendor, number of units, historic price range for same product, delivery date, details as to historical purchases, market data, etc.). Some of the search parameters may effect where the search is directed to (e.g., different searches may be directed to different searching components based on different application context indications, or searches may be limited to entities that can guarantee delivery by a certain date, etc.). Of course, some search parameters will be utilized as search query terms to be applied by the searching component.

Panels 408 and 410 contain indications of the results of a search carried out by a searching component. Panel 408 shows products and services from different venders that are the same or similar to the target of the purchase order. In this case, as is indicated by oval 406, the search produced an indication that the same bike is available from a different vendor for a lower price. Panel 410 shows alternate vendors (e.g., for the same product) that were encountered as a result of the searching process.

FIG. 5 is an example of a screenshot 500 associated with the small business accounting software application. The illustratively notices that the price in oval 506 is lower than the price in oval 508. Interested in the product associated with price 506, the user selects the "purchase now" option identified with oval 502. This causes pop-up box 504 to appear. Box 504 gives the user the option of canceling the current purchase order and starting a new purchase order for the product associated with price 506.

FIG. 6 is an example of a screenshot 600 associated with the small business accounting software application. Screenshot 600 is the new purchase order created after the user selects "add" from pop-up box 504. In one embodiment, one or more fields of the new purchase order are filled in automatically. For example, the vendor, product, price, etc. are filled in automatically when the user has approved the change in process flow. The new purchase order is illustratively communicated to the alternate supplier electronically, or using other methods of communication (e.g., fax, mail, etc.).

Thus, when the user creates a purchase order for an items or items (e.g., a trail bike) targeted at an existing supplier, query processing component 103 illustratively aggregates appropriate search parameters 105 and communicates them to an appropriate searching component (s). In particular, component 103 queries search engines, comparison shopping engines, and/or marketplace engines for better price matches or alternate items. This search is done in the context of the application (e.g., without leaving the application, e.g., not in an Internet browser application).

Further, the searching process can be leveraged to account for some level of understanding of the relevant business process (e.g., creating a purchase order inherently is a purchase with certain parameters like item, quantity, price delivery date, etc. . . . all of which can be utilized as a basis for query). In one embodiment, the searching process is executed against a subset of all available search/information providers (e.g., appropriate comparison search engines and appropriate marketplaces) with searching qualified by attributes relevant to the business process (e.g., item/UPC, description, item attributes, cost, delivery capacity, etc.) automatically. Thus, the user need not explicitly use information to search or initiate the search. The search is automatically done on behalf of the user. On completion of the search, the positive results (e.g., in the illustrated case, items that are similar with lower prices, better availability dates, etc.) are presented to the user within the context of the business process.

It should again be emphasized that the present invention is in no way limited to a purchase order context. This is but one example of an implementation of how the described integrated search features can be implemented. Those skilled in the art will appreciate that the same or similar concepts can be applied in many other scenarios without departing from the scope of the present invention.

Thus, the present subject matter deals with an integration of automatic, context-based search functionality into business applications. Two illustrative applicable computing devices will now be described.

Figure 7:
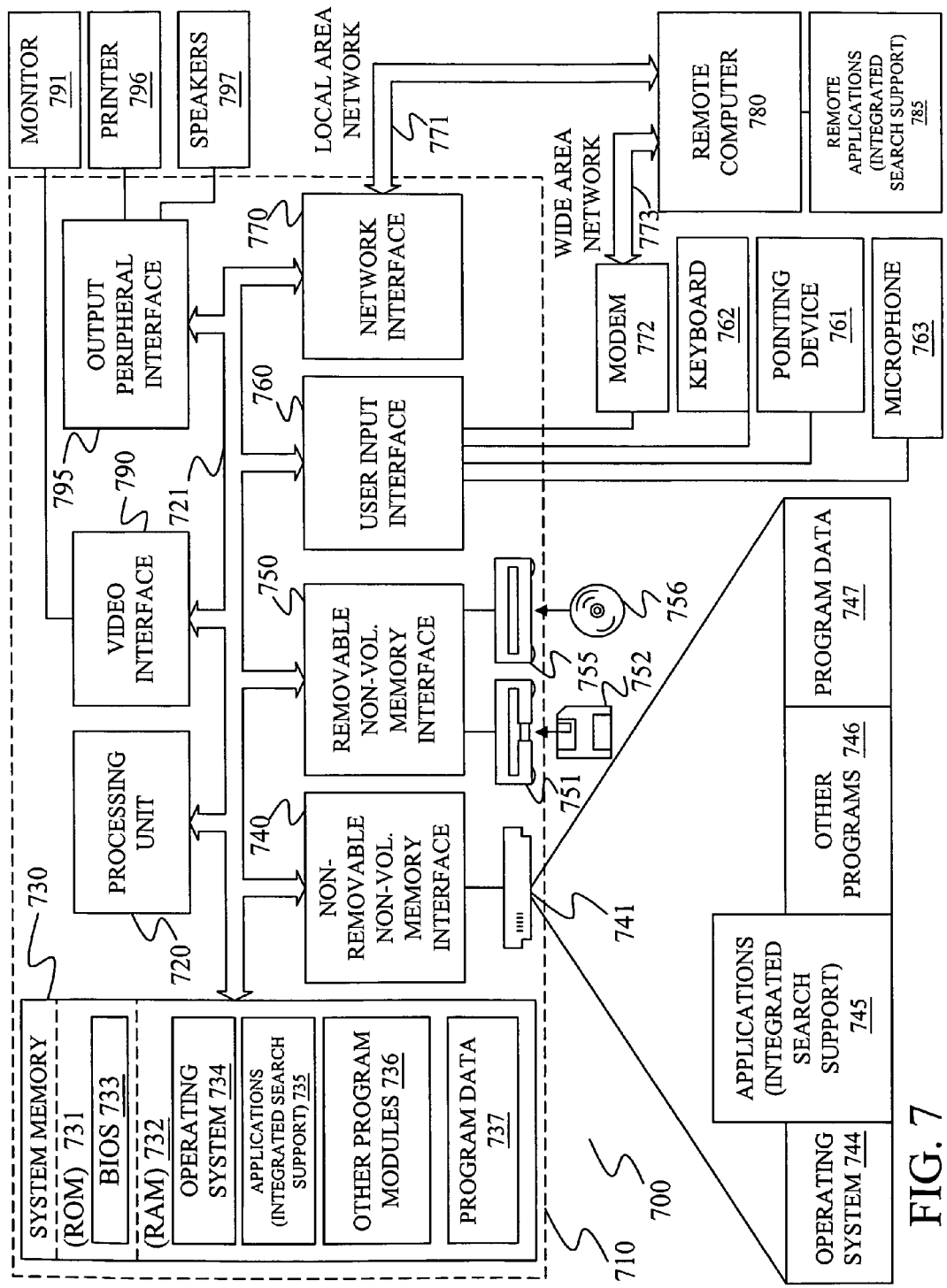
FIG. 7 is a diagrammatic representation of a computing system environment.

FIG. 7 illustrates an example of a suitable computing system environment 700 in which embodiments may be implemented. The computing system environment 700 is only one example of a suitable computing environment and is not intended to suggest any limitation as to the scope of use or functionality of the claimed subject matter. Neither should the computing environment 700 be interpreted as having any dependency or requirement relating to any one or combination of components illustrated in the exemplary operating environment 700.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described herein in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 7, an exemplary system for implementing some embodiments includes a general-purpose computing device in the form of a computer 710. Components of computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 710 typically includes a variety of computer readable media. Computer readable media can be any available media that can be accessed by computer 710 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 710. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736, and program data 737. Programs 735 are illustrated to demonstrate that at least one program can be configured to support business integrated search functionality as described herein. This need not necessarily be the case for any or all of the programs. Further, the support can be implemented from outside of the actual application. Further, programs 736 can also or alternatively be so configured.

The computer 710 may also include other removable/non-removable volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 7, provide storage of computer readable instructions, data structures, program modules and other data for the computer 710. In FIG. 7, for example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies. Programs 745 are illustrated to demonstrate that at least one program can be configured to support integrated search functionality as described herein. This need not necessarily be the case for any or all of the programs. Further, programs 746 can also or alternatively be so configured. Also, the functionality can be implemented from outside of the actual application despite being depicted as internal.

A user may enter commands and information into the computer 710 through input devices such as a keyboard 762, a microphone 763, and a pointing device 761, such as a mouse, trackball or touch pad. Other input devices (not shown) may include a joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. In addition to the monitor, computers may also include other peripheral output devices such as speakers 797 and printer 796, which may be connected through an output peripheral interface 795.

The computer 710 is operated in a networked environment using logical connections to one or more remote computers, such as a remote computer 780. The remote computer 780 may be a personal computer, a hand-held device, a server, a router, a network PC, a peer device or other common network node, and typically includes many or all of the elements described above relative to the computer 710. The logical connections depicted in FIG. 7 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example, and not limitation, FIG. 7 illustrates remote application programs 785 as residing on remote computer 780. It will be appreciated that the network connections shown are exemplary and other means of establishing a communications link between the computers may be used. Programs 785 are illustrated to indicate that at least one program supports integrated search functionality as described herein. This need not necessarily be the case for any or all of the programs. Also, the functionality can be implemented from outside of the actual application despite the internal location in the Figure. In one embodiment, computer 780 is a server device containing a search component for supporting the server-side functionality of the integrated search functionality described herein.

Figure 8:
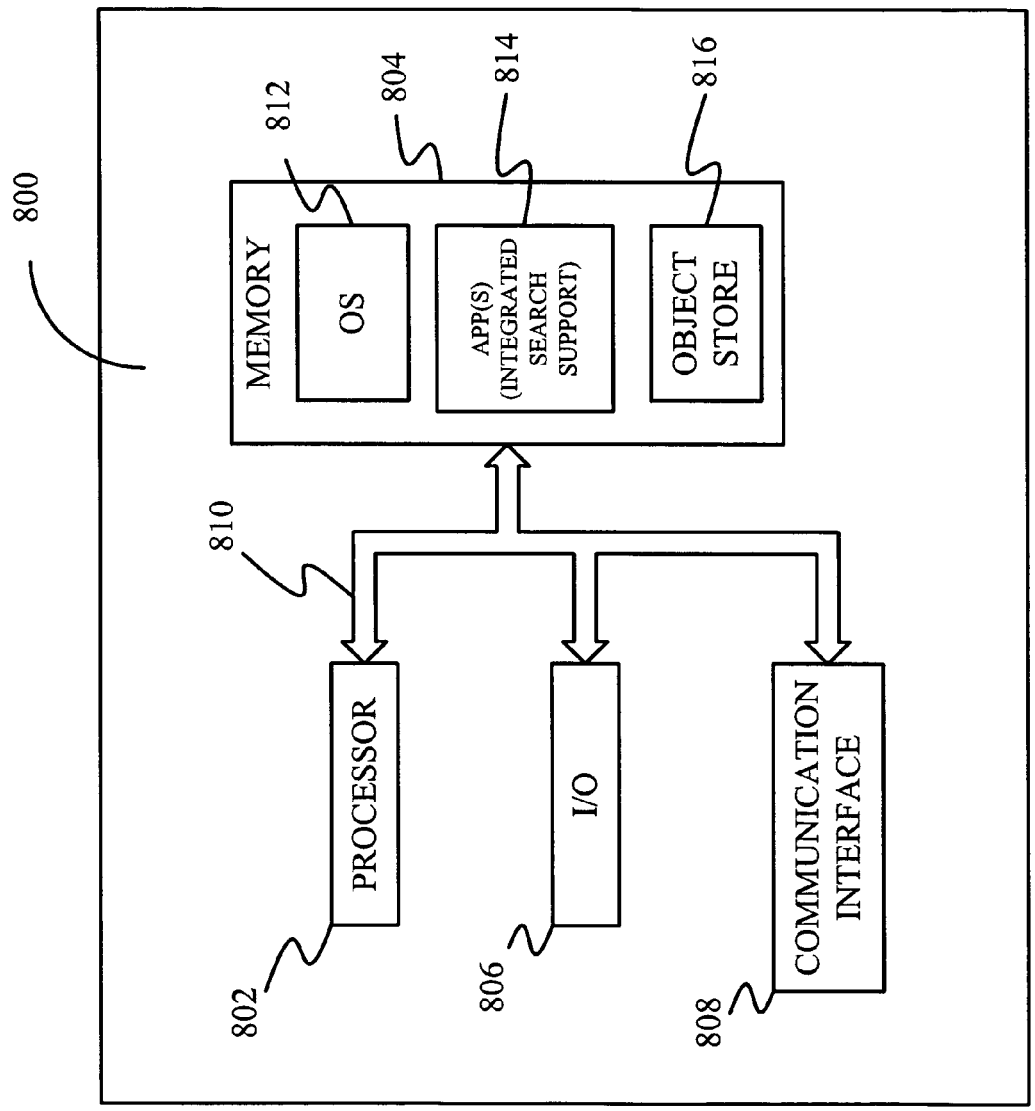
FIG. 8 is a diagrammatic representation of a mobile device environment.

FIG. 8 is a block diagram of a mobile device 800, which is an exemplary computing environment. Mobile device 800 includes a microprocessor 802, memory 804, input/output (I/O) components 806, and a communication interface 808 for communicating with remote computers or other mobile devices. In one embodiment, the afore-mentioned components are coupled for communication with one another over a suitable bus 810.

Memory 804 is implemented as non-volatile electronic memory such as random access memory (RAM) with a battery back-up module (not shown) such that information stored in memory 804 is not lost when the general power to mobile device 800 is shut down. A portion of memory 804 is illustratively allocated as addressable memory for program execution, while another portion of memory 804 is illustratively used for storage, such as to simulate storage on a disk drive.

Memory 804 includes an operating system 812, application programs 814 as well as an object store 816. Programs 814 are illustrated to indicate that at least one program supports the integrated search functionality described herein.

This need not necessarily be the case for any or all of the programs. During operation, operating system 812 is illustratively executed by processor 802 from memory 804. Operating system 812 is illustratively designed for mobile devices, and implements database features that can be utilized by applications 814 through a set of exposed application programming interfaces and methods. The objects in object store 816 are maintained by applications 814 and operating system 812, at least partially in response to calls to the exposed application programming interfaces and methods.

Communication interface 808 represents numerous devices and technologies that allow mobile device 800 to send and receive information. The devices include wired and wireless modems, satellite receivers and broadcast tuners to name a few. Mobile device 800 can also be directly connected to a computer to exchange data therewith. In such cases, communication interface 808 can be an infrared transceiver or a serial or parallel communication connection, all of which are capable of transmitting streaming information.

Input/output components 806 include a variety of input devices such as a touch-sensitive screen, buttons, rollers, and a microphone as well as a variety of output devices including an audio generator, a vibrating device, and a display. The devices listed above are by way of example and need not all be present on mobile device 800. In addition, other input/output devices may be attached to or found with mobile device 800.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of integrating automatic search functionality into a business application, the method comprising:

monitoring a software-implemented business application and recognizing when a user is entering a collection of data into a purchase order form as part of a purchase order business process wherein an item of inventory is ordered from a first vendor, and wherein entering a collection of data comprises entering data into a collection of fields that are part of the purchase order form, the collection of fields including a vendor identification field, an item to be purchased field, a quantity to be purchased field, and a purchase price field;

utilizing a computer processor that is a functional component of the computer to automatically generate a query based on information related to the purchase order business process as reflected in the purchase order form;

communicating the query to a search component;

receiving search results from the search component, wherein the search results are the outcome of a processing of the query;

displaying to the user a collection of information related to the search results, the collection of information being displayed simultaneously along side of the purchase order form on a graphical user interface, the collection of information including a related products and services section and a sponsored sites section, the related products and services section including products and services from different vendors that are the same or similar to the item of inventory, the sponsored sites section including alternative vendors for the item of inventory that were encountered as a result of the processing of the query;

receiving, from the user, an input indicative of a particular item within the collection of information related to the search results; and following receipt of the input indicative of the particular item, facilitating an auto-generation process, wherein the auto-generation process causes data related to the particular item to be automatically added to said purchase order form, wherein the auto-generation process causes the purchase order form to be automatically altered so as to alter the purchase order business process to no longer involve ordering the item of inventory from the first vendor but instead involve ordering the item of inventory from a second vendor, wherein the auto-generation process causes a purchase price within the purchase order form to be automatically substituted for a different purchase price already entered into the purchase price field that is part of the purchase order form, wherein the auto-generation process causes the second vendor to be automatically substituted for the first vendor within the purchase order form, and wherein the auto-generation process requires receipt of an indication of approval from the user before data related to the item of inventory is automatically added to said purchase order form, and wherein the indication of approval includes user consent to substitute the second vendor for the first vendor within the purchase order form, the indication of approval being received through a second graphical user interface that is separate from the graphical user interface that includes the purchase order form and the collection of information related to the search results.

2. The method of claim 1, wherein the query automatically generated based on information related to the purchase order business process contains a search parameter that is an attribute of a historical transaction that is completely separate and distinct from, and occurred before, any purchase transaction accomplished via processing of said purchase order form, and wherein the historical transaction occurred prior to said step of recognizing when the user is entering the collection of data, and wherein the query further contains a search parameter that is based on a user context, the user context including a role of the user within an organization.

3. The method of claim 1, wherein the query automatically generated based on information related to the purchase order business process incorporates pricing data related to a historic transaction completely executed within the software-implemented business application prior to said step of recognizing when the user is entering the collection of data.

4. The method of claim 1, wherein the auto-generation process causes data related to the item of inventory to be automatically substituted for existing data within one or more data fields within the purchase order form.

5. A computer-implemented method of integrating automatic search functionality into a business application, the method comprising:

monitoring a business application and recognizing when a user is initiating a transaction that involves a financial expenditure;

utilizing a computer processor that is a functional component of a computer to automatically generate a query based on information related to the financial expenditure;

communicating the query to a search component, the search component being implemented as a data abstraction service that publishes search parameters to various search services, the search parameters including business data related to the transaction, the business data being in a canonical format, the abstraction service transforming the canonically formatted business data to formats that satisfy requirements of the various search services;

receiving search results from the search component, wherein the search results are the outcome of a processing of the query;

displaying a collection of information related to the search results;

receiving an input indicative of a particular item of information within the collection of information; and in response to the input indicative of the particular item of information, automatically transitioning a business process within the application, wherein automatically transitioning comprises automatically causing data in a form related to the financial expenditure to be deleted and replaced with alternate data reflected in the particular item of information, wherein the data in the form is entered by the user, wherein the alternate data is not entered by the user but is instead obtained through the collection of information related to the search results, and wherein automatically transitioning comprises requiring that a user approve the deletion and the replacement before automatically causing the data in the form related to the financial expenditure to be deleted and replaced with the alternate data.

6. The method of claim 5, wherein automatically transitioning further comprises facilitating auto-generation of a collection of text within fields contained within the first form, wherein the second form is the first form updated with the collection of text, and wherein the canonically formatted business data includes a product name, a product description, a UPC code, and a price.

7. The method of claim 5, wherein automatically transitioning further comprises creating a revised purchase order, the revised purchase order containing details related to a different financial transaction, the different financial transaction being different than said financial transaction, wherein the revised purchase order is the second form, and wherein the published search parameters are tagged with business location and contact information.

8. The method of claim 5, wherein the query incorporates a search parameter that is something other than data input by the user as part of the transaction.

9. The method of claim 5, wherein the query incorporates data user-input pricing data that is not a purchase price to be paid as part of the financial transaction.

10. The method of claim 1, wherein the auto-generation process causes data related to the item of inventory to be automatically added such that at least one item of data entered by the user into a field that is part of the purchase order form is automatically replaced with data related to the item of inventory.

11. A computer-implemented method of integrating automatic search functionality into a business application, the method comprising:

monitoring a software-implemented business application and recognizing when a user is entering a collection of data into a purchase order form as part of a purchase order business process wherein an item of inventory is ordered from a first vendor, and wherein entering a collection of data comprises entering data into a collection of fields that are part of the purchase order form, the collection of fields including a vendor identification field, an item to be purchased field, a quantity to be purchased field, and a purchase price field;

utilizing a computer processor that is a functional component of the computer to automatically generate a query based on information related to the purchase order business process as reflected in the purchase order form;

communicating the query to a search component;

receiving search results from the search component, wherein the search results are the outcome of a processing of the query;

displaying to the user a collection of information related to the search results, the collection of information being displayed simultaneously along side of the purchase order form on a graphical user interface, the collection of information including a related products and services section and a sponsored sites section, the related products and services section including products and services from different vendors that are the same or similar to the item of inventory, the sponsored sites section including alternative vendors for the item of inventory that were encountered as a result of the processing of the query;

receiving, from the user, an input indicative of a particular item within the collection of information related to the search results;

following receipt of the input indicative of the particular item, facilitating an auto-generation process, wherein the auto-generation process causes data related to the particular item to be automatically added to said purchase order form, wherein the auto-generation process causes the purchase order form to be automatically altered so as to alter the purchase order business process to no longer involve ordering the item of inventory from the first vendor but instead involve ordering the item of inventory from a second vendor, wherein the auto-generation process causes a purchase price within the purchase order form to be automatically substituted for a different purchase price already entered into the purchase price field that is part of the purchase order form, and wherein the auto-generation process causes the second vendor to be automatically substituted for the first vendor within the purchase order form; and wherein the query automatically generated based on information related to the purchase order business process contains a search parameter that is an attribute of a historical transaction that is completely separate and distinct from, and occurred before, any purchase transaction accomplished via processing of said purchase order form, wherein the historical transaction occurred prior to said step of recognizing when the user is entering the collection of data, and wherein the query further contains a search parameter that is based on a user context, the user context including a role of the user within an organization.

12. The method of claim 11, wherein the query automatically generated based on information related to the purchase order business process incorporates pricing data related to a historic transaction completely executed within the software-implemented business application prior to said step of recognizing when the user is entering the collection of data.

13. The method of claim 11, wherein the auto-generation process causes data related to the item of inventory to be automatically substituted for existing data within one or more data fields within the purchase order form.

14. The method of claim 2, wherein the auto-generation process requires receipt of an indication of approval from the user before data related to the item of inventory is automatically added to said purchase order form, and wherein the indication of approval includes consent to substitute the second vendor for the first vendor within the purchase order form.

* * * * *